United States Patent [19]

Tongu

[11] Patent Number: 4,872,319
[45] Date of Patent: Oct. 10, 1989

[54] AIR-COOLED ABSORPTION TYPE COOLING/HEATING WATER GENERATING APPARATUS

[75] Inventor: Shinji Tongu, Shizuoka, Japan

[73] Assignee: Yazaki Corporation, Tokyo, Japan

[21] Appl. No.: 212,617

[22] Filed: Jun. 28, 1988

[30] Foreign Application Priority Data

Nov. 19, 1987 [JP] Japan ............................. 62-292660

[51] Int. Cl.⁴ ............................................. F25B 15/00
[52] U.S. Cl. ................................... 62/141; 62/476
[58] Field of Search ............................. 62/476, 141

[56] References Cited

U.S. PATENT DOCUMENTS

| | | | |
|---|---|---|---|
| 4,454,726 | 6/1984 | Hibino et al. ............... | 62/148 |
| 4,563,882 | 1/1986 | Kunugi et al. ............... | 62/476 |
| 4,691,528 | 9/1987 | Tongu ........................... | 62/476 X |
| 4,691,532 | 9/1987 | Reid et al. .................... | 62/476 |

FOREIGN PATENT DOCUMENTS 0216629 4/1987 European Pat. Off.

*Primary Examiner*—Lloyd L. King
*Attorney, Agent, or Firm*—Robbins & Laramie

[57] ABSTRACT

In an air-cooled absorption type cooling/heating water generating apparatus using a refrigerant and an absorbent solution and including a high-temperature regenerator, a separator, a low-temperature regenerator, an air-cooled condenser, an evaporator, an air-cooled absorber, a high-temperature solution heat exchanger, a low-temperature solution heat exchanger, a solution circulating pump and a refrigerant circulating pump, a constant flow rate control valve is disposed in a conduit connected between the high-temperature solution heat exchanger and the low-temperature regenerator so as to control the flow rate of the solution flowing through the conduit, and a pressure regulating valve is disposed in a conduit connected between the low-temperature regenerator and the condenser so as to regulate the internal pressure of the separator.

4 Claims, 4 Drawing Sheets

AIR-COOLED ABSORPTION TYPE COOLING/HEATING WATER GENERATING APPARATUS

BACKGROUND OF THE INVENTION

1. Field of the Invention

This invention relates to an air-cooled absorption type cooling/heating water generating apparatus, and more particularly to an apparatus of the type described above which is provided with means for regulating the pressure and flow rate of a refrigerant and a solution (an absorbent) from which heat is removed in a condenser and an absorber directly cooled by external air (ambient air) and which are separated from each other in a separator after being heated in a regenerator, so as to prevent undesirable high-temperature degradation of the solution and undesirable build-up of an excessively high pressure in the apparatus attributable to a high temperature of ambient air, whereby the apparatus is suitable for stably carrying out its refrigerating operation.

2. Description of the Prior Art

An air-cooled absorption type water cooling/heating water generating apparatus is known in which a solution having absorbed a refrigerant evaporated in an evaporator is fed by a solution circulating pump to flow through a low-temperature solution heat exchanger and a high-temperature solution heat exchanger into a high-temperature regenerator to be heated in the high-temperature regenerator, and, after separation of the refrigerant from the solution in a separator, the separated refrigerant in vapor form is fed through a low-temperature regenerator into an air-cooled condenser to be condensed in the condenser, the condensed refrigerant being then fed by a refrigerant circulating pump to be recirculated into the evaporator. On the other hand, in the known apparatus, the solution separated from the refrigerant in the separator is fed through the high-temperature solution heat exchanger into the low-temperature regenerator and then into the low-temperature solution heat exchanger and, after heat exchange therein, the solution is recirculated into an air-cooled absorber cooled by ambient air sucked by a cooling fan. When the temperature of ambient air rises, a corresponding rise occurs in the temperature of the solution in the high-temperature regenerator or the internal pressure of the separator increases in such an prior art apparatus. Therefore, there is provided with a temperature sensor for sensing the temperature rise of the solution or a pressure sensor for sensing the internal pressure increase of the separator, and a control unit for detecting output signal of each sensor and generating a control signal to increase the rotation speed of the cooling fan so as to enhance the cooling effect, thereby preventing the temperature rise or the pressure increase, or generating a control signal to decrease the quantity of fuel supplied from a fuel valve so as to decrease the rate of fuel combustion thereby preventing the temperature rise or the pressure increase.

Actually, however, the air-conditioning or cooling load is large when the temperature of ambient air is high. Therefore, prevention of the temperature rise by merely increasing the rotation speed of the cooling fan thereby enhancing the cooling effect is virtually impossible because the physical input becomes eight times as large as the original input when, for example, the volume of air supplied by the cooling fan is doubled. Also, the decrease in the quantity of supplied fuel results in an adverse effect of an undesirable decrease in the cooling ability, and the apparatus cannot deal with a user's demand for increasing the cooling ability to meet an increased cooling load.

Thus, when the temperature of ambient air is high, the cooling effect is not appreciably increased by merely increasing the rotation speed of the cooling fan. As a result, the prior art apparatus has had fatal defects such as undesirable degradation of the property of the solution which is, for example, lithium bromide, due to the high temperature, unusual consumption of an inhibitor, and undesirable corrosion of steel members attributable to generation of non-condensable gases, The prior art apparatus has also been defective in that it cannot deal with a greatest demand of a user, that is, it cannot meet a user's cooling demand for increasing the cooling ability, and its commercial value would be lost.

SUMMARY OF THE INVENTION

It is an object of the present invention to provide an air-cooled absorption type cooling/heating water generating apparatus which can prevent undesirable high-temperature degradation of the solution even when the temperature of ambient air is high and which can deal with a user's demand for increasing the cooling ability.

The present invention which attains the above object provides an air-cooled absorption type cooling/heating water generating apparatus in which a solution having absorbed a refrigerant evaporated in an evaporator is fed by a solution circulating pump to flow through a low-temperature solution heat exchanger and a high-temperature solution heat exchanger into a high-temperature regenerator to be heated in the high-temperature regenerator and, after separation of the refrigerant from the solution in a separator, the separated refrigerant in vapor form is fed through a low-temperature regenerator into an air-cooled condenser to be condensed in the condenser, the condensed refrigerant being fed by a refrigerant circulating pump to be recirculated into the evaporator, while the solution separated from the refrigerant in the separator is fed through the high-temperature solution heat exchanger into the low-temperature regenerator and then into the low-temperature solution heat exchanger and, after heat exchange in the high-temperature solution heat exchanger, the low-temperature regenerator and the low-temperature solution heat exchanger, the solution is recirculated into an air-cooled absorber cooled by ambient air sucked by a cooling fan, wherein a constant flow rate control valve is provided in a conduit connected between the high-temperature solution heat exchanger and the low-temperature regenerator to control the flow rate of the solution of medium density and a pressure regulating valve is provided in a conduit connected between the low-temperature regenerator and the air-cooled condenser to regulate the pressure of the refrigerant vapor.

According to the air-cooled absorption type cooling/heating water generating apparatus of the present invention, the constant flow rate control valve provided in the medium-density solution conduit connected between the high-temperature solution heat exchanger and the low-temperature regenerator controls the flow rate of the medium-density solution depending on the internal pressure difference between the separator and the low-temperature regenerator so that the medium-concentration solution flows through the conduit at a predetermined flow rate, and the valve opening of the pressure regulating valve provided in the refrigerant vapor conduit connected between the low-temperature regenerator and the air-cooled condenser is increased when the internal pressure of the separator exceeds a predetermined setting, thereby discharging the refrigerant vapor to the low pressure side and preventing an excessive pressure increase at the high pressure side.

Therefore, according to the present invention, an undesirable internal pressure increase in the separator can be prevented to prevent an undesirable temperature rise of the solution and to maintain the refrigerant absorbability of the solution by the provision of the fixed flow rate control valve in the medium-density solution conduit and the pressure regulating valve in the refrigerant vapor conduit. Therefore, the fatal defects of the prior art apparatus such as unusual consumption of the inhibitor and undesirable corrosion of the steel members attributable to generation of non-condensable gases can be obviated, and the high cooling ability demanded by the user can also be ensured.

DETAILED DESCRIPTION OF THE INVENTION

For a better understanding of the present invention, known means for regulating the pressure and flow rate of a refrigerant and a solution in a prior art air-cooled absorption type cooling/heating water generating apparatus to deal with a high ambient air temperature will be described with reference to FIG. 4, before describing preferred embodiments of the present invention in detail.

Figure 4:
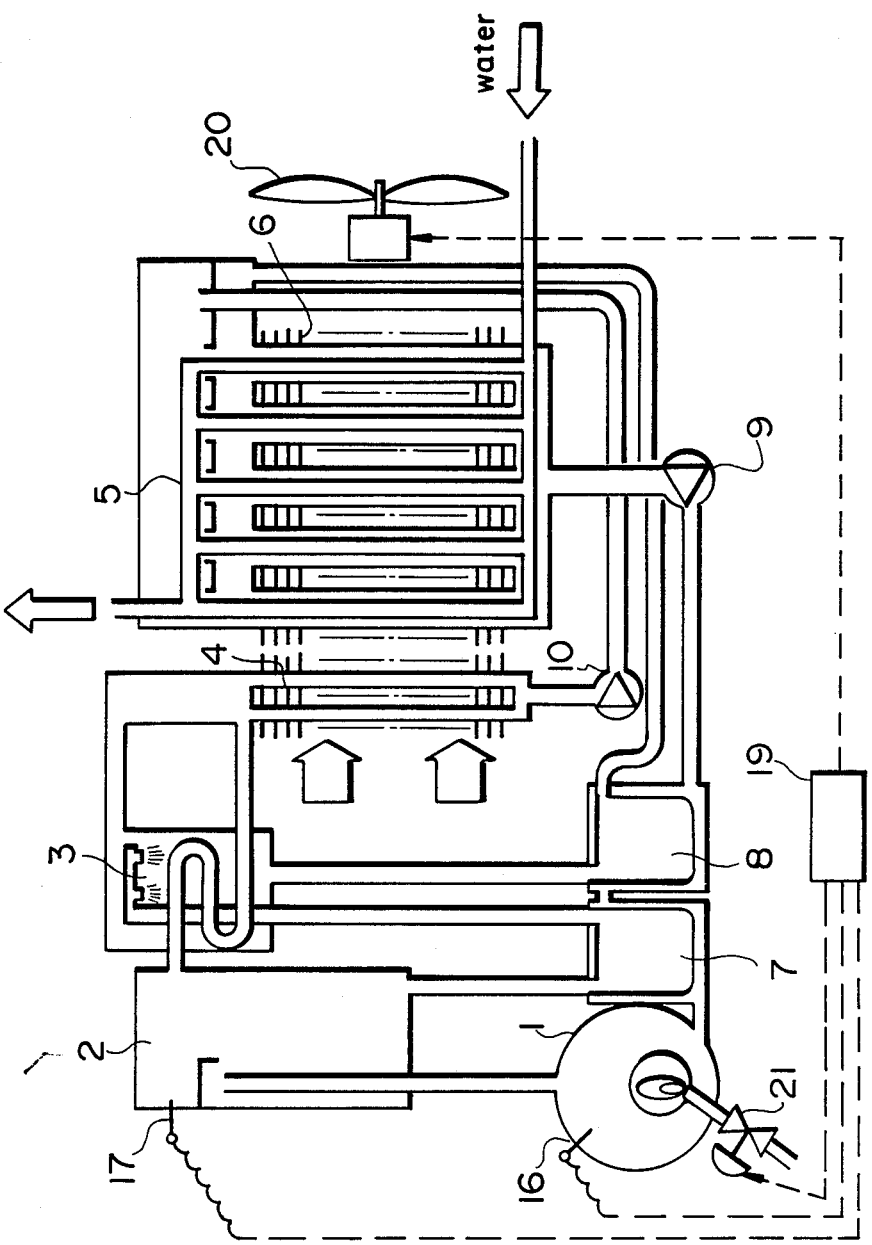
FIG. 4 is a schematic diagram showing such a system in a prior art apparatus.

Referring to FIG. 4, a solution having absorbed a refrigerant evaporated in an evaporator 5 is fed by a solution circulating pump 9 to flow through a low-temperature solution heat exchanger 8 and a high-temperature solution heat exchanger 7 into a high-temperature regenerator 1 to be heated therein. After separation of the refrigerant from the solution in a separator 2, the separated refrigerant in vapor form is fed through a low-temperature regenerator 3 into an air-cooled condenser 4 to be condensed in the condenser 4, and the condensed refrigerant is fed by a refrigerant circulating pump 10 to be recirculated into the evaporator 5. On the other hand, the solution separated from the refrigerant in the separator 2 is fed through the high-temperature solution heat exchanger 7 into the low-temperature regenerator 3 and then into the low-temperature solution heat exchanger 8, and, after heat exchange in the high-temperature solution heat exchanger 7, the low-temperature regenerator 3 and the low-temperature solution heat exchanger 8, the solution is recirculated into an air-cooled absorber 6 cooled by ambient air sucked by a cooling fan 20. When the temperature of ambient air rises, a corresponding rise occurs in the temperature of the solution in the high-temperature regenerator 1 in such an apparatus or the internal pressure of the separator 2 increases in such an apparatus. A temperature sensor 16 senses the temperature rise of the solution or a pressure sensor 17 senses the internal pressure increase of the separator 2, and the detection output signal of each sensor 16 or 17 is applied to a control unit 19. In response to the application of the detection output signal from the sensor 16 or 17, the control unit 19 generates a control signal to increase the rotation speed of the cooling fan 20 so as to enhance the cooling effect, thereby preventing the temperature rise or the pressure increase, or the control unit 19 generates a control signal to decrease the quantity of fuel supplied from a fuel valve 21 so as to decrease the rate of fuel combustion, thereby preventing the temperature rise or the pressure increase.

Figure 1:
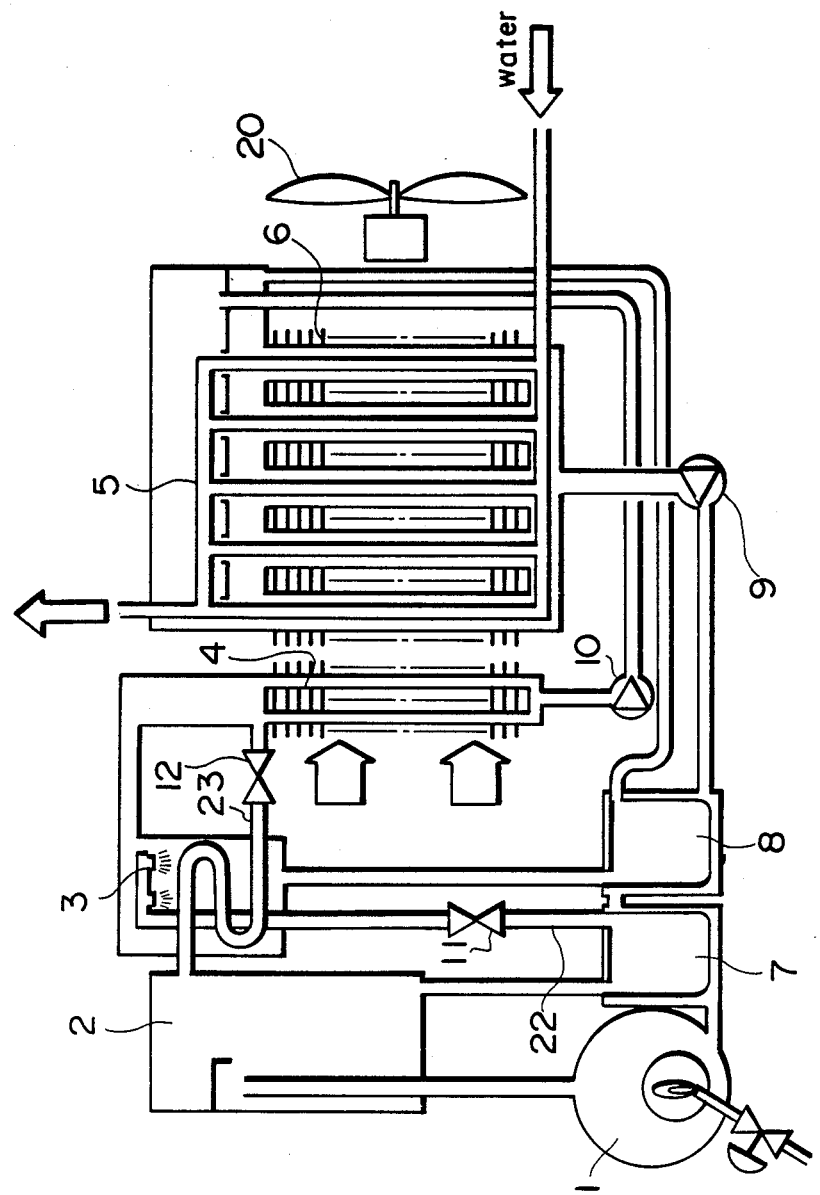
FIG. 1 is a schematic diagram showing a circulating system for circulating a refrigerant and a solution in an embodiment of the air-cooled absorption type cooling-/heating water generating apparatus of the present invention.

An embodiment of the present invention will now be described with reference to FIG. 1. FIG. 1, like reference numerals are used to designate like parts appearing in FIG. 4.

An embodiment of the air-cooled absorption type cooling/heating water generating apparatus of the present invention includes a circulating system arrangement in which a refrigerant such as water is absorbed in a solution such as lithium bromide solution and, after the steps of removing heat from the solution and heating the solution, the refrigerant is separated from the solution.

Referring to FIG. 1, the refrigerant is evaporated in an evaporator 5 by receiving heat from cold water flowing in a direction of the arrow shown in FIG. 1, and the evaporated refrigerant is absorbed in the solution to provide a low-temperature diluted solution. This diluted solution is fed by a solution circulating pump 9 to flow through a low-temperature solution heat exchanger 8 and a high-temperature solution heat exchanger 7 into a high-temperature regenerator 1 to be heated in the high-temperature regenerator 1. After separation of the refrigerant from the solution in a separator 2, the separated refrigerant in vapor form is subjected to heat exchange in a low-temperature regenerator 3 and is then condensed in an air-cooled condenser 4. The condensed refrigerant is fed by a refrigerant circulating pump 10 to be recirculated into the evaporator 5. On the other hand, the high-temperature dense solution left after the separation of the refrigerant in the separator 2 is fed through he high-temperature solution heat exchanger 7 into the low-temperature regenerator 3 and then into the low-temperature solution heat exchanger 8. After heat exchange in the high-temperature solution heat exchanger 7, the low-temperature regenerator 3 and the low-temperature solution heat exchanger 8, the solution is recirculated into an air-cooled absorber 6 which is cooled by ambient air sucked by a cooling fan 20 to cool the refrigerant generating absorption heat during absorption. A constant flow rate control valve 11 is disposed in a conduit 22 connected between the high-temperature solution heat exchanger 7 and the low-temperature regenerator 3 to control the flow rate of the solution of a medium density, and a pressure regulating valve 12 is disposed in a conduit 23 connected between the low-temperature regenerator 3 and the air-cooled condenser 4 to regulate the pressure of the refrigerant vapor.

The operation of the apparatus of the present invention will now be described.

The pressure regulating valve 12 is a primary pressure regulating valve. A rise in the temperature of ambient air results in a corresponding reduction of the cooling ability of the air-cooled condenser 4. That is, as a result of the rise in the temperature of ambient air, the internal pressure of the air-cooled condenser 4 increases first, and such a pressure increase occurs successively in each of the low-temperature regenerator 3, the high-temperature regenerator 1 and the separator 2 located upstream of the air-cooled condenser 4. When the internal pressure of the separator 2 increases beyond a predetermined setting of the pressure regulating valve 12, the valve opening of the pressure regulating valve 12 increases to discharge an excess of the refrigerant vapor generated in the high-temperature regenerator 1 toward the low pressure side. Therefore, the internal pressure of the separator 2 is always regulated to a level equal to or lower than the predetermined level, so that the temperature of the solution in the high-temperature regenerator 1 does not become excessively high.

The constant flow rate control valve 11 controls the flow rate of the medium-density solution on the basis of the result of detection of the internal pressure difference between the separator 2 and the low-temperature regenerator 3, so that the flow rate of the medium-density solution can be maintained constant.

Another embodiment of the present invention will be described with reference to FIG. 2.

Figure 2:
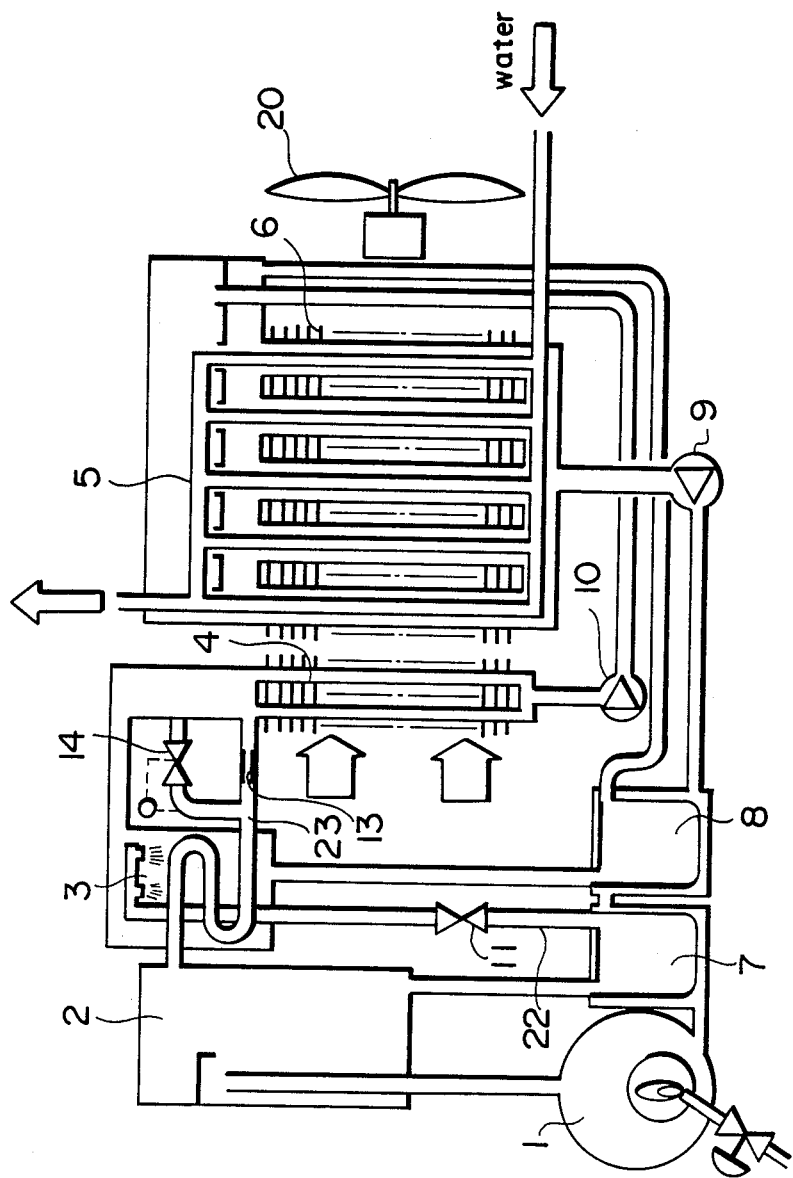
FIG. 2 is a schematic diagram similar to FIG. 1 to show another embodiment of the present invention.

Referring to FIG. 2 showing a partial modification of the embodiment shown in FIG. 1, a fixed orifice 13 is provided in the conduit 23 through which the refrigerant heated in the high-temperature regenerator 1 and separated from the solution in the separator 2 is fed in vapor form into the low-temperature regenerator 3 and then into the air-cooled condenser 4 after the heat exchange in the low-temperature regenerator 3. A safety valve or a relief valve 14 is disposed in parallel with the fixed orifice 13.

In operation, when the internal pressure of the high-temperature regenerator 1, hence, that of the separator 2 increases to exceed a pressure setting of the safety valve or relief valve 14 due to a temperature rise of ambient air, the valve 14 acts to discharge the refrigerant vapor to the low pressure side thereby preventing the pressure increase.

Still another embodiment of the present invention will be described with reference to FIG. 3.

Figure 3:
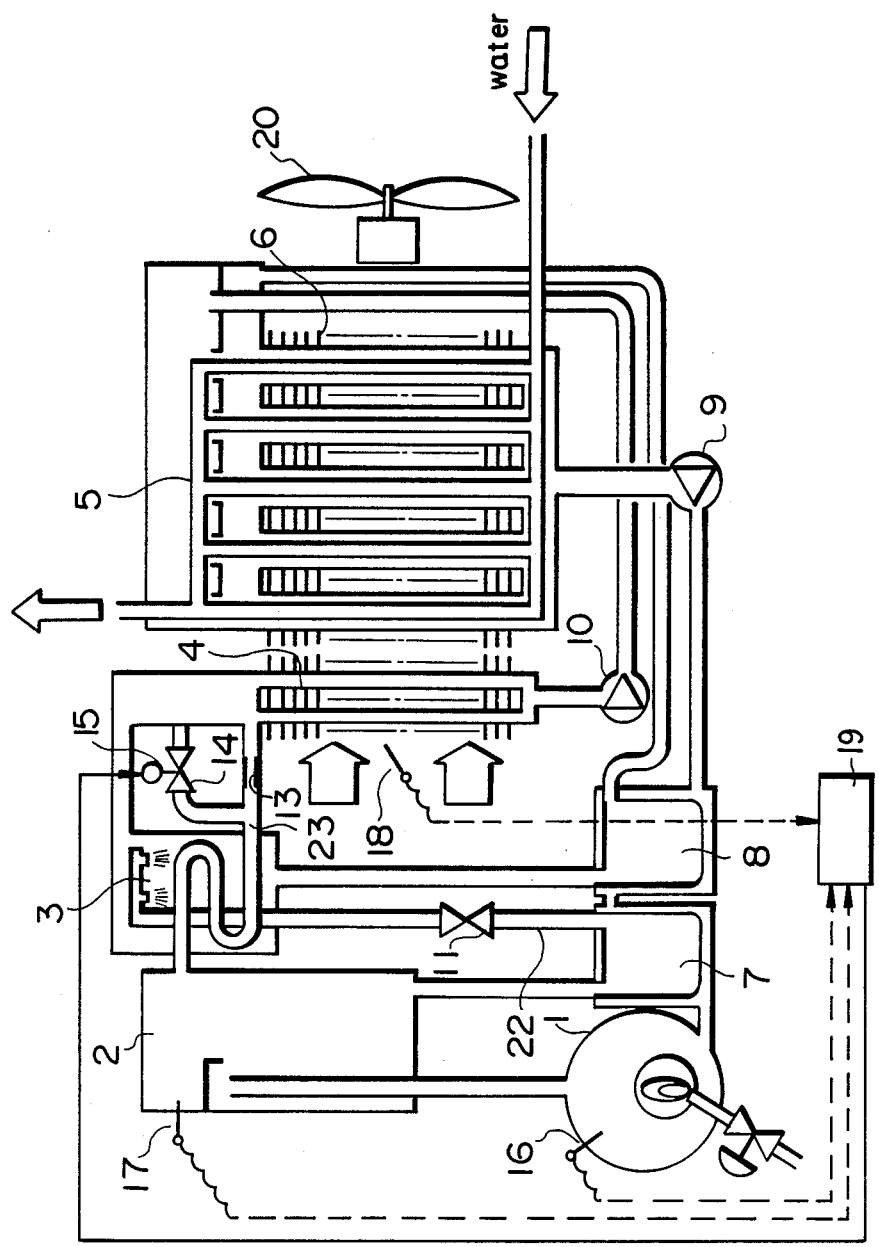
FIG. 3 is a schematic diagram similar to FIG. 2 to show still another embodiment of the present invention.

Referring to FIG. 3 showing a partial modification of the embodiment shown in FIG. 2, the control valve 14 which is actuated by an electrical, oil, hydraulic or pneumatic actuator 15 is disposed in parallel with the fixed orifice 13. The apparatus further includes a solution temperature sensor 16 sensing the temperature of the solution in the high-temperature regenerator 1, a pressure sensor 17 sensing the internal pressure of the separator 2, an ambient-air temperature sensor 18 sensing the temperature of ambient air, and a control unit 19 receiving the detection output signals of the sensors 16, 17 and 18 and generating an output signal for controlling the control valve 14, when at least one of the detection output signals of the sensors indicates that a setting is exceeded.

In operation, when at least one of the detection output signals of the ambient-air temperature sensor 18, the pressure sensor 17 and the solution temperature sensor 16 indicates that the detected value exceeds a predetermined setting due to a temperature rise of ambient air, the control unit 19 generates its control signal to open the control valve 14, thereby preventing the pressure increase.

While preferred embodiments of the present invention have been described above by way of example, the present invention is in no way limited to such specific embodiments, and various changes and modifications may be made therein without departing from the spirit of the present invention.

What is claimed is:

1. An air-cooled absorption type cooling/heating water generating apparatus comprising:

means for evaporating a refrigerant and absorbing the evaporated refrigerant in a solution and removing heat from the refrigerant-absorbed solution by cooling with ambient air;

high-temperature regenerating means for heating said refrigerant-absorbed solution;

means for separating said heated refrigerant-absorbed solution into the refrigerant and the solution;

low-temperature regenerating means for subjecting said refrigerant separated in vapor form to heat exchange;

a condenser for condensing said refrigerant vapor;

pump means for circulating said refrigerant-absorbed solution and said condensed refrigerant;

a heat exchanger for subjecting said heat-removed refrigerant-absorbed solution to heat exchange before said refrigerant-absorbed solution is fed into said high-temperature regenerating means and said separating means and also subjecting said separated solution to heat exchange before said separated solution is returned to said refrigerant absorbing and heat removing means;

flow rate regulating means disposed in a solution conduit extending between said heat exchanger and said low-temperature regenerating means, said flow rate regulating means being a constant flow rate control valve which controls the flow rate of said solution on the basis of the result of detection of an internal pressure difference between said separating means and said low-temperature regenerating means to provide for solution flow through said solution conduit at a predetermined flow rate; and pressure regulating means disposed in an evaporated refrigerant conduit extending between said separating means and said condenser, said pressure regulating means being a primary pressure regulating valve whose valve opening is increased when internal pressure of said separating means exceeds a predetermined pressure value, 2. An air-cooled absorption type cooling/heating water generating apparatus comprising:

means for evaporating a refrigerant, absorbing the evaporated refrigerant in a solution and removing heat from the refrigerant-absorbed solution by cooling with ambient air;

high-temperature regenerating means for heating said refrigerant-absorbed solution;

means for separating said heated refrigerant-absorbed solution into the refrigerant and the solution;

low-temperature regenerating means for subjecting said refrigerant separated in vapor form to heat exchange;

a condenser for condensing said refrigerant vapor;

pump means for circulating said refrigerant-absorbed solution and said condensed refrigerant;

a heat exchanger for subjecting said heat-removed refrigerant-absorbed solution to heat exchange before said refrigerant-absorbed solution is fed into said high-temperature regenerating means and said separating means and also subjecting said separated solution to heat exchange before said separated solution is returned to said refrigerant absorbing and heat removing means;

flow rate regulating means disposed in a solution conduit extending between said heat exchanger and said low-temperature regenerating means, said flow rate regulating means being a constant flow rate control valve which controls the flow rate of said solution on the basis of the result of detection of an internal pressure difference between said separating means and said low-temperature regenerating means, so that the solution flows through said conduit of the solution at a predetermined flow rate; and pressure regulating means disposed in an evaporated refrigerant conduit extending between said separating means and said condenser, said pressure regulating means being a combination of a fixed orifice disposed in said conduit of the evaporated refrigerant and a safety valve disposed in parallel with said orifice, 3. An apparatus according to claim 2, wherein said safety valve is actuated by at least one of hydraulic, pneumatic and electrical actuating means and is controlled by at least one of a detected value of the temperature of ambient air and the internal pressure of said separating means, 4. An apparatus according to claim 2, wherein said safety valve is a control valve, and said apparatus further comprises actuating means for actuating said control valve, sensor means for sensing the internal temperature of said high-temperature regenerating means, the temperature of ambient air and the internal pressure of said separating means, and control means for controlling said control valve on the basis of the detection output of at least one of said sensor means.

* * * * *